United States Patent [19]

LaBeau

[11] Patent Number: 5,251,027
[45] Date of Patent: Oct. 5, 1993

[54] TELEPHOTO SENSOR TRIGGER IN A SOLID STATE MOTION ANALYSIS SYSTEM

[75] Inventor: Gary A. LaBeau, LaMesa, Calif.

[73] Assignee: Eastman Kodak Company, Rochester, N.Y.

[21] Appl. No.: 884,315

[22] Filed: May 11, 1992

Related U.S. Application Data

[63] Continuation of Ser. No. 618,210, Nov. 26, 1990.

[51] Int. Cl.⁵ .............................................. H04N 7/18
[52] U.S. Cl. ...................................... 358/105; 358/93; 358/335; 358/108; 360/10.1
[58] Field of Search ............... 358/105, 93, 83, 213.19, 358/909, 906, 168, 101, 335, 213.25, 213.26, 209, 217; 360/10.1, 9.1

[56] References Cited

U.S. PATENT DOCUMENTS

| | | | |
|---|---|---|---|
| 4,496,995 | 1/1985 | Colles et al. | 360/9.1 |
| 4,713,686 | 12/1987 | Ozaki et al. | 358/105 |
| 4,789,894 | 12/1988 | Cooper | 358/105 |
| 4,825,291 | 4/1989 | Mimura et al. | 358/105 |
| 4,860,096 | 8/1989 | Long et al. | 358/105 |
| 4,875,093 | 10/1989 | Koishi et al. | 358/83 |
| 4,979,034 | 12/1990 | Funaki | 358/105 |
| 5,034,811 | 7/1991 | Palm | 358/105 |
| 5,111,410 | 5/1992 | Nakayama et al. | 358/105 |

Primary Examiner—James J. Groody
Assistant Examiner—Michael H. Lee
Attorney, Agent, or Firm—William F. Noval

[57] ABSTRACT

A solid state motion analysis system stores images of an event at a fast frame rate and plays back the images at a slower frame rate to facilitate analysis of the event. The motion analysis system includes a solid state imager which is selectively operable at different frame rates and further includes a solid state memory for storing a plurality of image frames. A trigger circuit includes a telephoto sensor which senses a change in a scene being imaged by the motion analysis system. When a scene change is sensed, the trigger circuit produces a trigger signal to alter the mode of operation of the motion analysis system. Thus, storage of image frames in the solid state memory may be started or stopped when a change in luminance of the scene occurs.

12 Claims, 4 Drawing Sheets

TELEPHOTO SENSOR TRIGGER IN A SOLID STATE MOTION ANALYSIS SYSTEM

This is a continuation of application Ser. No. 618,210, filed Nov. 26, 1990.

BACKGROUND OF THE INVENTION

This invention relates in general to a motion analysis system which records images of an event at a fast frame rate and plays back the images of the event at a slower frame rate so that the event may be analyzed. More particularly, this invention relates to a solid state motion analysis system having a telephoto sensor trigger circuit for changing the mode of operation of the motion analysis system in response to a change in an image characteristic (luminance) of the event.

Motion analysis systems are useful for analyzing rapidly changing events. One type of motion analysis system records a great number of images during an event at a high or fast image frame rate and reproduces the image frames more slowly at a lower frame rate. Thus, any movement occurring during the event may be analyzed in a step by step progression. Applications for a motion analysis system include, malfunctions in high speed machinery, movements of an athlete, testing of safety equipment, shattering of an object, etc. One type of motion analysis system is disclosed in commonly assigned U.S. Pat. No. 4,496,995 issued Jan. 29, 1985. As disclosed in the latter patent, the motion analysis system/fast frame recorder includes a video camera, a variable speed processor and a video display monitor. The camera is read out in block format so that, a plurality of lines of video information that correspond to rows of photosites in the camera solid state imager, are simultaneously recorded on magnetic tape in parallel longitudinal tracks. During playback, the magnetic tape is played back at a reduced tape speed. A plurality of parallel video signals reproduced from parallel tracks on the tape are processed into a serial video signal which may be used with standard video monitors. A magnetic tape motion analysis system is advantageous, because of the ability to record a large number of image frames and because of the nonvolatility of the image storage. However, there are limitations to magnetic tape recording. Thus, magnetic tape motion analysis systems tend to be costly, since, in recording and reproducing a plurality of parallel video signals, separate record and reproduce signal processing circuitry must be provided for each video signal channel. Moreover, since the video signals are recorded directly on magnetic tape in an analog format, picture quality is degraded significantly due to induced flutter and other noise, due to reduced bandwidth and increased phase distortion and due to imprecisely recorded pixel signal values.

In many applications where the use of a motion analysis system is appropriate, the event to be analyzed may occur after a long period of static activity in the scene under analysis. Due to the inherent recording length constraints of a magnetic tape motion analysis system, such a system's ability to capture randomly occurring events may require the recording of a large number of image frames which are unnecessary for the analysis of the event. During playback, the unwanted images must be scanned before images relating to the event can be analyzed, resulting in a waste of time, money and recording tape. Moreover, certain events may be incapable of being recorded due to the length of elapsed time between recordable events.

SUMMARY OF THE INVENTION

According to the present invention, there is provided a motion analysis system which minimizes the limitation of magnetic tape motion analysis systems. According to an aspect of the present invention, a motion analysis system includes solid state memory for storing a plurality of image frames produced by a solid state imager, wherein, picture degradation produced by flutter in a magnetic tape motion analysis system is eliminated and wherein dropouts are minimized to single pixel events. According to another aspect of the present invention, video information representing image frames are stored in digital format in the solid state memory. Thus, media noise and electronic noise associated with recording and playback from magnetic tape is inherently eliminated. Moreover, bandwidth limitations and phase distortion produced in magnetic tape recording systems is minimized by digital storage of image frames.

According to a further aspect of the present invention, a solid state motion analysis system includes telephoto sensor trigger circuitry which senses when a change in an image characteristic, such as luminance, occurs in a scene. If a change in image characteristic is sensed, a trigger signal is produced to alter the mode of operation of the motion analysis system in order to capture a desired event. According to a preferred aspect of the present invention, the trigger signal causes the solid state memory to either begin or stop recording image frames produced by said solid state imager.

DESCRIPTION OF THE DRAWINGS

In a detailed description of a preferred embodiment of the invention presented below, reference is made to the accompanied drawings, in which like numerals refer to like elements.

DETAILED DESCRIPTION OF THE PREFERRED EMBODIMENT

Figure 1:
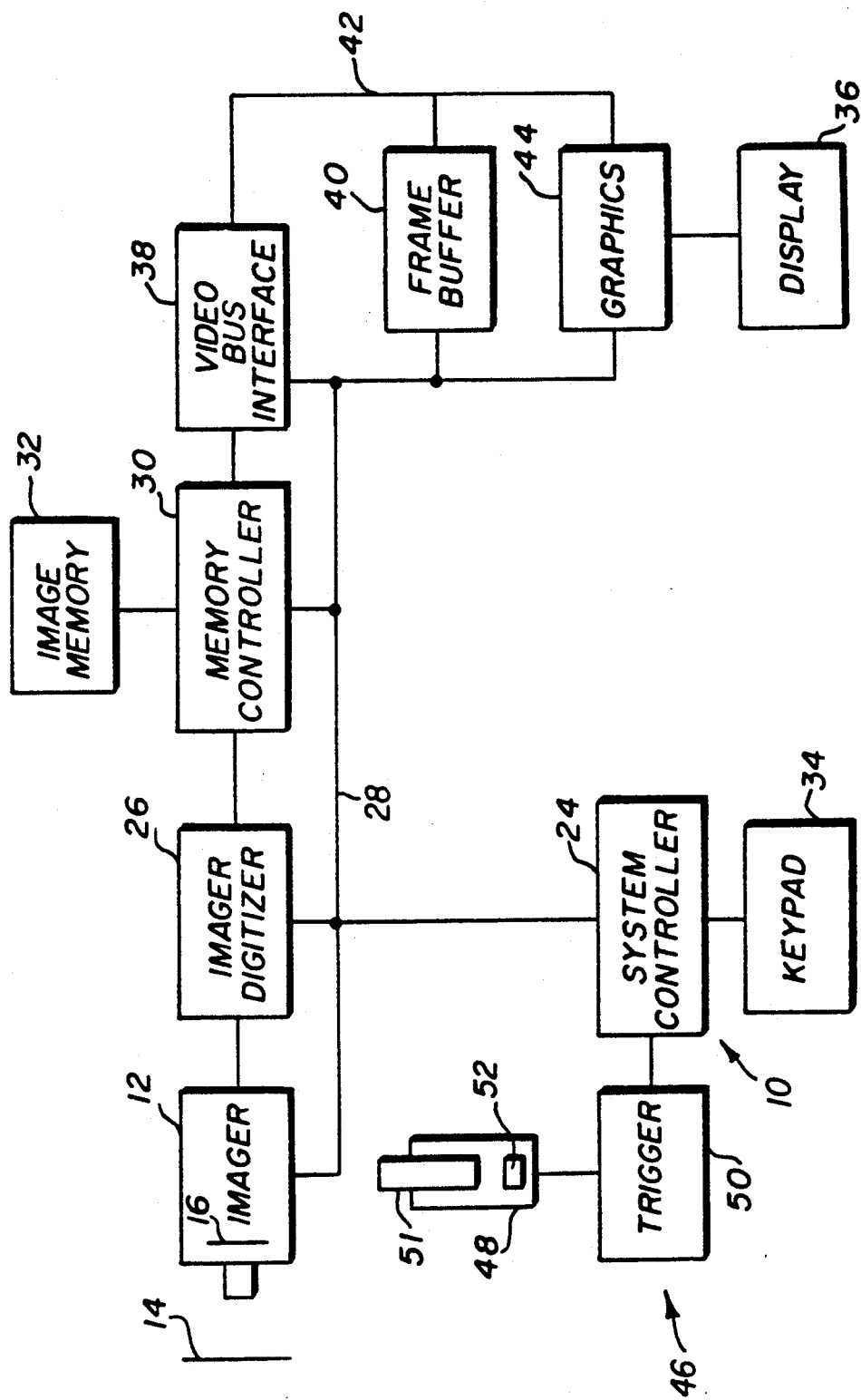
FIG. 1 is a block diagram of a preferred embodiment of the solid state motion analysis system of the present invention.

Referring now to FIG. 1, there will be described a preferred embodiment of the motion analysis system of the present invention. As shown in FIG. 1, motion analysis system 10 includes solid state imager 12 which images an event such as scene 14 by means of a solid state area image sensor 16. Imager 12 is controlled by system controller 24. Controller 24 supplies suitable timing and control signals to imager 12 over bus 28 as a function of operator selectable parameters, such as frame rate and exposure time, among others. Imager 12 may operate for example at frame rates of 1 to 1,000 frames per second.

Figure 2:
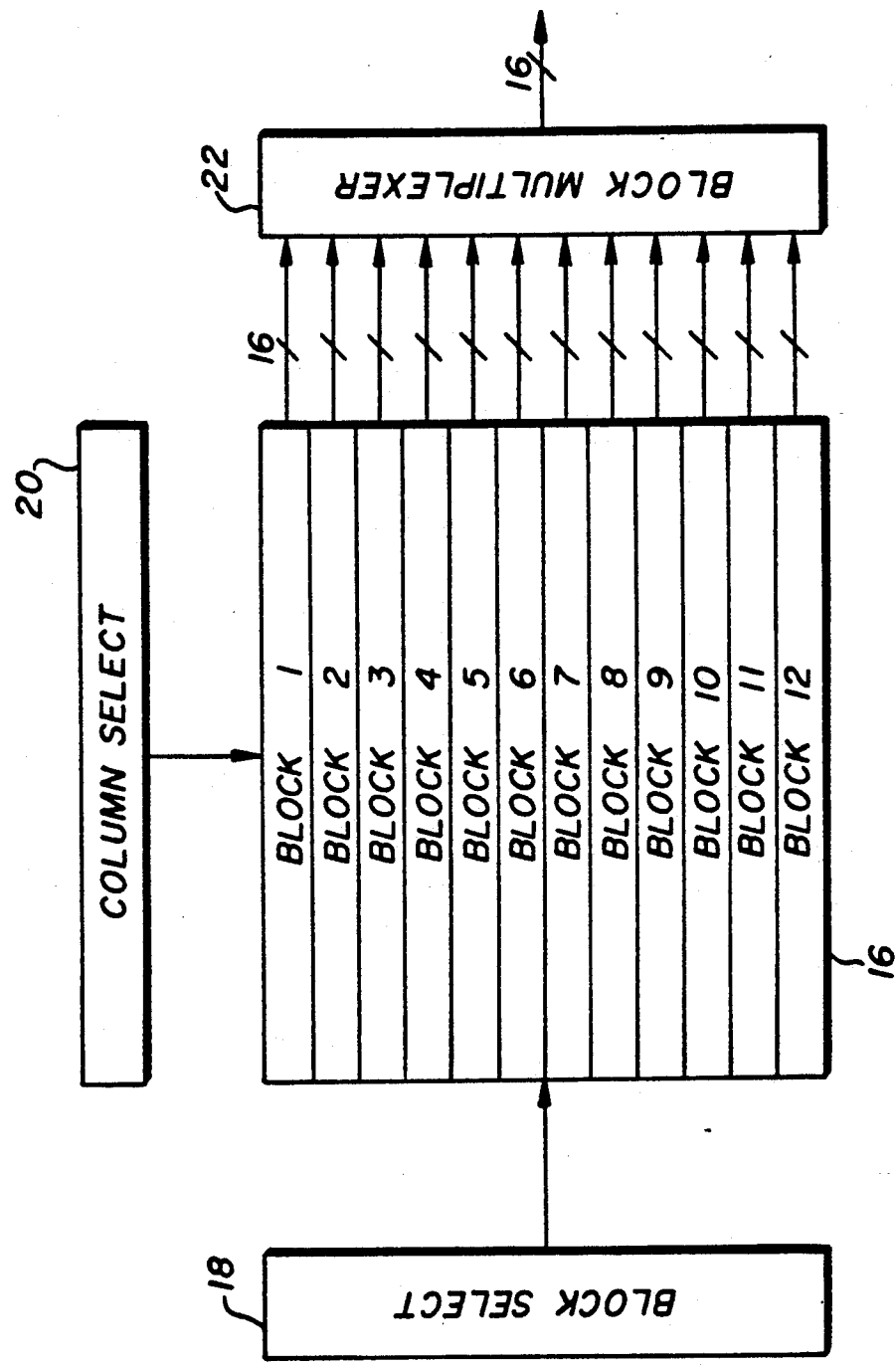
FIG. 2 is a functional block schematic diagram of a block readable image sensor.

Image sensor 16 is preferably a block readable area image sensor. The basic concept of a block readout of a solid state area image sensor and the timing and control thereof is disclosed in U.S. Pat. No. 4,322,752 in the name of James A. Bixby. Although the referenced patent provides detailed, information, a brief description of the concept of block readout may be illustrated with respect to FIG. 2. FIG. 2 shows an area image sensor 16 that includes an array of photosites (not individually shown) arranged in rows and columns. For example, sensor 16 may include an array of 192 rows of 256 photosites in each row. Each photosite represents a picture element (pixel) of an image projected onto sensor 16. For purposes of readout, sensor 16 is schematically shown as being formated into 12 blocks of 16 photosite rows in each block. Through appropriate control circuitry, including block select circuit 18 and column select circuit 20, blocks 1 to 12 of sensor 16 are sequentially readout as parallel rows of photosites to block multiplexer circuit 22. Multiplexer 22 produces an image frame signal which includes 12 sequential blocks of video information wherein each block of video information includes 16 parallel lines of analog video signals. Each line of video information includes 256 pixels of variable image characteristics such as luminance, color, etc.

The parallel lines of analog video signals from imager 12 are supplied to imager digitizer 26. Imager digitizer 26 amplifies and conditions the parallel analog signals for preparation to be digitized. Digitizer 26 includes an analog to digital converter on each parallel signal line in order to convert each analog signal into a digital signal. Each analog-to-digital converter will output a digital signal having a digital value of a predetermined number of bits, such as eight. Digitizer 26 takes the bit information from each analog-to-digital converter and converts the information into a bit serial format on an output line. Thus, in this example, after serialization, there are the same number of parallel digital signal lines which are output from image digitizer 26 as the number of parallel analog signal lines which are input to digitizer 26. System control 24 supplies control and timing signals to digitizer 26 over control and timing bus 28.

External data signals from a source (such as keyboard 34) may be temporally associated with an image frame by interleaving the external data with the image data in digitizer 26.

Memory controller 30 receives the parallel lines of serialized digital information from digitizer 26 and stores it in image memory 32. Memory 32 is made up of a number of solid state random access memory devices, such as DRAMS or SRAMS. Inherently, to store information in a random access memory, a location needs to be addressed and then the information written to their input port. Memory controller 30 is used to give order to the random access capability of the solid state memory. When recording, controller 30 generates the address signals to the RAM in a known fixed sequential format.

Motion analysis system 10 may be operated in several recording modes. In one recording mode, once image memory 32 is full up, no more images from imager 12 are stored in memory 32. In another recording mode, the storing of image frames in memory 32 is circular so that once memory 32 is full (i.e. cannot store another image frame in a unique location) the newest image frame is recorded over the oldest image frame. In this manner, image frames from imager 12 are continuously recorded in memory 32 over older images frames until a stop signal is applied by system controller 24. This stop signal may be the result of a signal generated by the operator from keypad 34 or by a trigger signal. A trigger signal may be produced by an external trigger source such as the telephoto sensor trigger circuit of the present invention.

Figure 3:
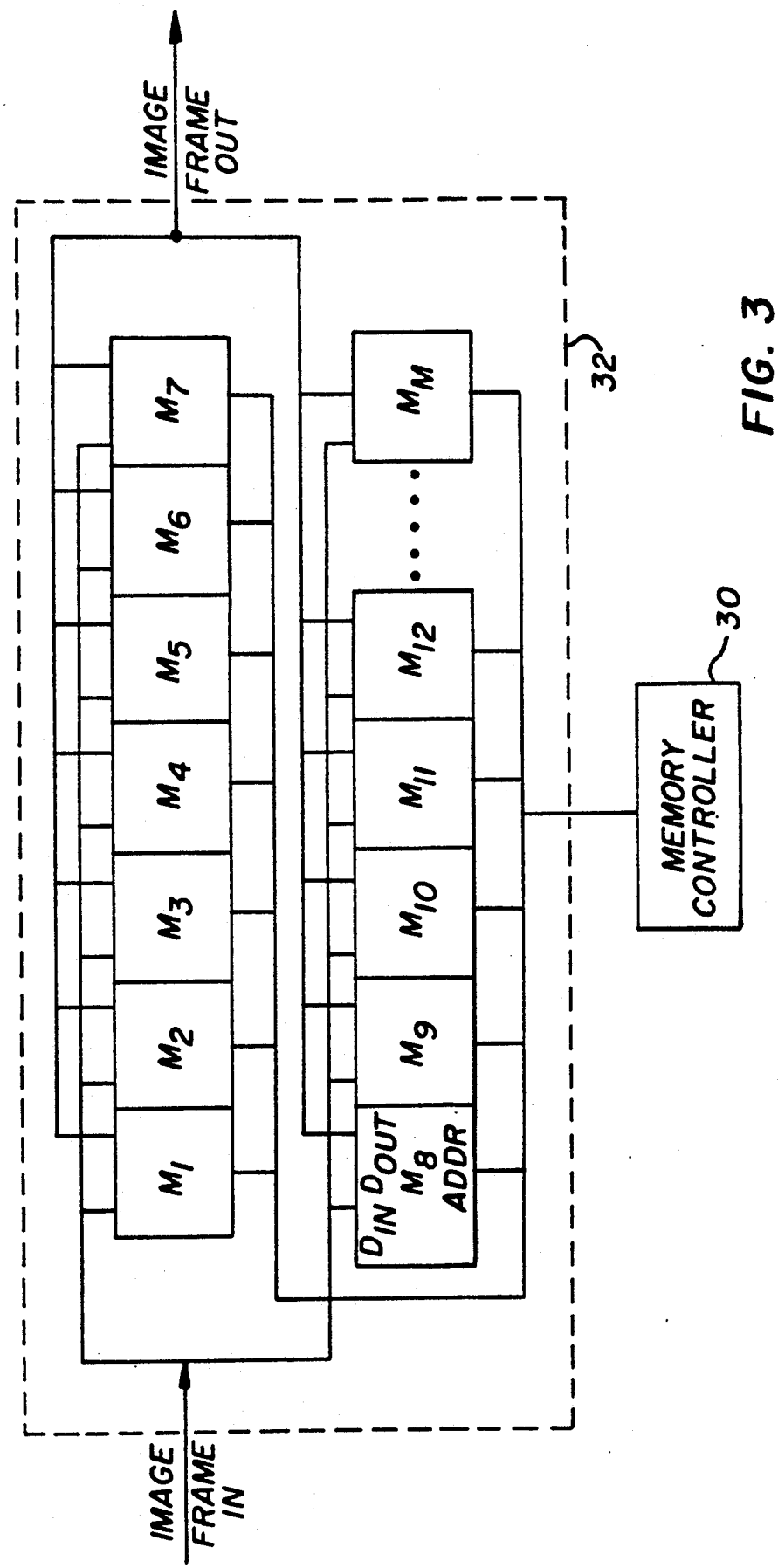
FIG. 3 is a functional block schematic diagram of the solid state memory of the embodiment of FIG. 1.

Memory 32 may have a storage capacity of any size but should be large enough to store a sufficient number of image frames to capture an event in totality for later analysis. As shown in FIG. 3, memory 32 includes M image frame locations numbered $M_1$ to $M_{mm}$. As an example, if an image frame plus external data information forms a display matrix of 256×256 pixels and each pixel is represented by 8 bits of information, each image frame stored in memory 32 occupies approximately 65 kilobytes of memory. If 1,000 image frames are to be stored, then memory 32 must have approximately 65 megabytes of solid state memory storage.

Image frames stored in memory 32 are displayed on display device 34. Memory controller 30 receives the serialized parallel digital information of an image frame from image memory 32 and supplies it to video bus interface 38. Interface 38 reformats the digital video received from memory 32 via controller 30 and stores it in frame buffer 40 by way of video bus 42. The video bus interface 38 also receives header data relating to each image frame, deinterleaves the header information and stores it in a reserved section of each frame stored in frame buffer 40. Frame buffer 40 has the capacity to store several frames of video data.

The digital video stored in frame buffer 40 is supplied to graphics module 44 by way of video bus 42. Graphics module 44 sums data border information with the video information and converts the digital signal to an analog signal which is displayed on display device 36.

According to the present invention, motion analysis system 10 includes a telephoto sensor trigger apparatus 46. Trigger apparatus 46 alters the mode of operation of motion analysis system 10 when there is a change in scene 14. The scene change may, for example, be a change in the brightness (luminance) of the scene, sudden motion in a static scene, etc. A change in an image characteristic of scene 14 identifies an event to be recorded for later analysis. If motion analysis system 10 is in a continuous recording mode, in which new image frames are recorded over old image frames in memory 32, the trigger signal produced by trigger apparatus 46 is used to stop recording. Thus, image frames before and after the triggering event are selectively stored in the memory 32. The trigger signal produced by apparatus 46 can also be used to start the recording of image frames produced by imager 12.

As shown in FIG. 1, trigger apparatus 46 includes a telephoto sensor 48 and trigger circuit 50. Telephoto sensor 48 includes a telephoto lens 51 and a photosensor 52. Lens 51 is focusable on scene 14 and produces an optical image which is sensed by photosensor 52. Photosensor 52 can sense the entire image or only a portion of the image (such as the central region). Trigger circuit 50 receives an electrical signal from photosensor 52 and produces a trigger signal in response to a change in a scene characteristic (e.g., a change in scene brightness due to an explosion or sudden movement in a static scene).

Figure 4:
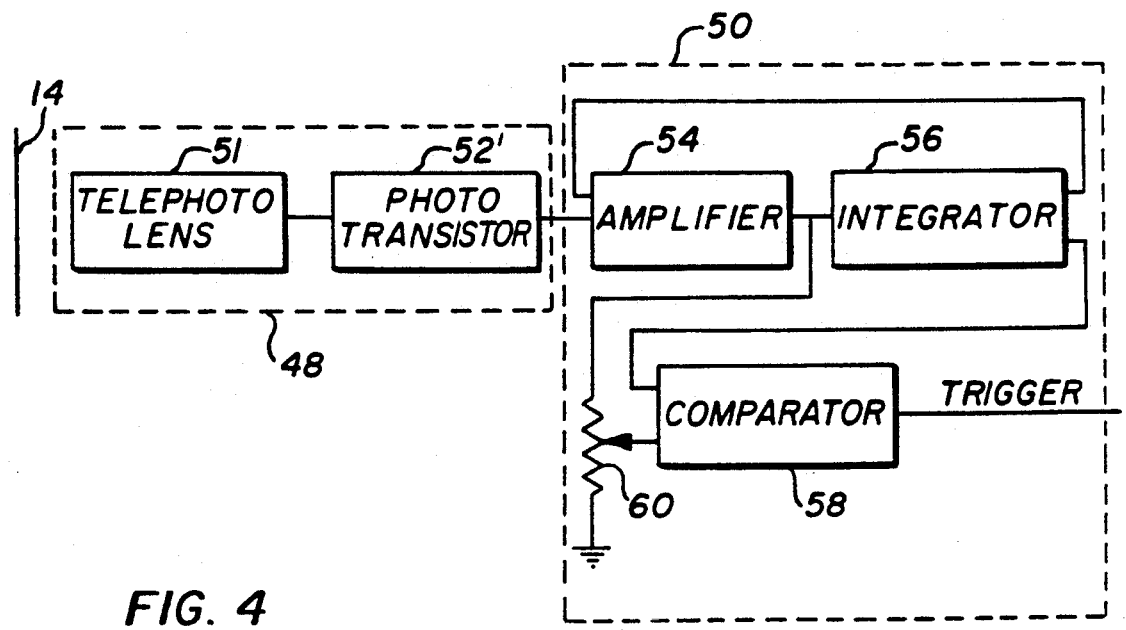
FIG. 4 is a block schematic diagram of a trigger circuit of the embodiment of FIG. 1.

FIG. 4 shows apparatus 46 in greater detail in which an image of scene 14 is projected by telephoto lens 51 onto phototransistor 52' which senses the brightness of the image. Trigger circuit 50 receives the signal produced by phototransistor 52'. Circuit 50 includes an amplifier 54, integrator 56, comparator 58 and adjustable resistor 60. The signal from phototransistor 52 is amplified by amplifier 54 and averaged in integrator 56. The averaged signal is fed back to the input of amplifier 54 and applied to one input of comparator 58. A selectable part of the output from amplifier 54 is applied to another input of comparator 58 by means of adjustable resistor 60 which sets the trigger threshold.

When there is a large increase in the signal from phototransistor 52' due to an increase in the brightness of scene 14, comparator 58 produces a trigger signal. The trigger signal is applied to system controller 24 to effect a change in the mode of operation of system 10. If system 10 is operating in a circular buffer mode in which new images are stored in memory 32 over the oldest images, once memory 32 is filled, the trigger signal stops the recording process. Thus, images of scene 14 before and after the trigger signal will be stored allowing analysis of a scene before and after a triggering event. If system 10 is stopped, the trigger signal will start storing of images in memory 32.

Figure 5:
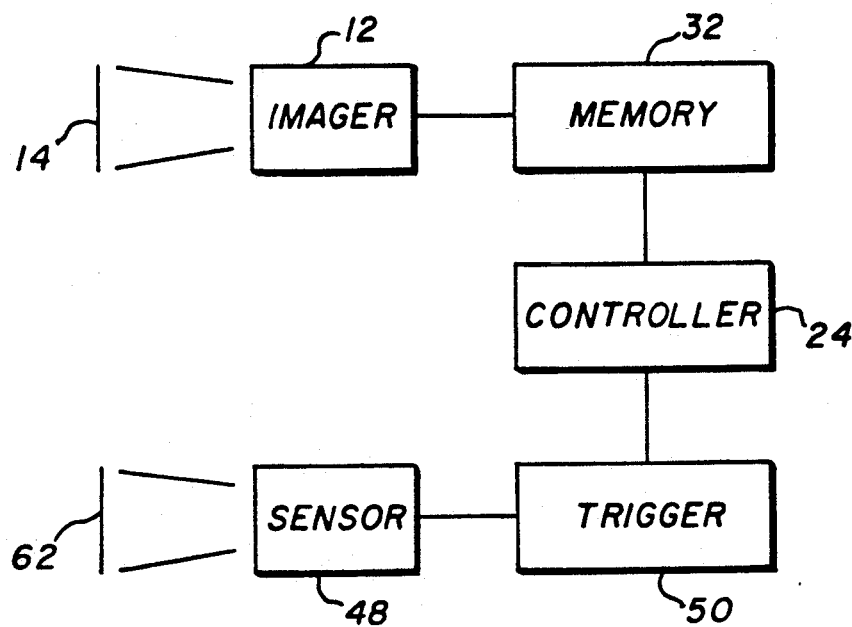
FIG. 5 is a block diagram of another embodiment of the present invention.

In the application shown in FIG. 1, telephoto sensor 48 and imager 12 observe the same scene. FIG. 5, illustrates an application where sensor 48 and imager 12 observe different scenes. As shown, imager 12 observes and records images from scene 14, while telephoto sensor 48 observes scene 62 which may be remote from scene 14. This feature greatly expands the versatility of the telephoto sensor trigger apparatus.

The present invention has the following advantages.

1. Since the telephoto sensor trigger apparatus may be set up remotely from a scene under observation, it is operable at distances both close to and far from such scene.

2. The apparatus is noninvasive, i.e., it does not change the scene being observed.

3. The telephoto trigger apparatus can observe a different event independently of the event observed by the motion analysis system.

Although the invention has been described in detail with particular reference to a preferred embodiment thereof, it will be understood that variations and modifications can be effected within the spirit and scope of the invention as described above and as defined in the appended claims.

What is claimed is:

1. A solid state motion analysis system comprising:
    solid state imager means for capturing an image of a scene, and for producing an image frame signal, wherein said imager means is selectively operable at different image frame rates up to several hundred frames per second;
    telephoto sensor means, for passively, noninvasively sensing a change in a changeable characteristic of said scene wherein said telephoto sensor means includes a telephoto lens and a photosensor optically coupled to said telephoto lens, such that said telephoto lens produces an optical image of a scene which is focused on said photosensor;
    wherein said telephoto sensor means is separate from said imager means and independently locatable relative thereto at a substantial distance therefrom;
    means for producing a trigger signal in response to a change in scene characteristic sensed by said photosensor of said telephoto sensor means; and
    solid state memory means for storing a plurality of image frame signals produced by said imager means, wherein an alteration in the mode of operation of said memory means is effected in response to said trigger signal.

2. The solid state motion analysis system of claim 1 wherein said telephoto sensor means is located to sense a changeable characteristic of a different scene than is captured by said imager means.

3. The system of claim 1 wherein said memory means is operating in a circular buffer mode and wherein said trigger signal stops the storage of image frame signals in said memory means.

4. The motion analysis system of claim 1 wherein said memory means is stopped and wherein said trigger signal starts storage of image frame signals in said memory means.

5. The system of claim 1 wherein said telephoto sensor means senses a change in scene brightness.

6. A solid state motion analysis system comprising:
    solid state imager means having a plurality of photosites arranged in an array of rows and columns for capturing an imager of a scene, and for producing an imager frame signal by reading out blocks of parallel subsets of photosites;
    wherein said image frame signal includes sequential blocks of video information, wherein each block of video information includes parallel lines of video signals and wherein said imager means is selectively operable at different imager frame rates up to several hundred frames per second;
    telephoto sensor means for passively, noninvasively sensing a change in a changeable scene characteristic wherein said telephoto sensor means includes a telephoto lens and a photosensor optically coupled to said telephoto lens, such that said telephoto lens produces an optical image of a scene which is focused on said photosensor;
    wherein said telephoto sensor means is separate from said imager means and independently locatable relative thereto at a substantial distance therefrom;
    means for producing a trigger signal in response to a change in scene characteristic sensed by said photosensor of said telephoto sensor means; and
    solid state memory means for storing a plurality of image frame signals produced by said imager means, wherein an alteration in the mode of operation of said memory means is effected in response to said trigger signal.

7. The system of claim 1 wherein said solid state imager means is selectively operable at frame rates up to at least a few hundred frames per second.

8. The system of claim 1, wherein said solid state imager means is selectively operable at frame rates up to at least 1,000 frames per second.

9. The system of claim 6 wherein said solid state imager means is selectively operable at frame rates up to at least a few hundred frames per second.

10. The system of claim 6 wherein said solid state imager means is selectively operable at frame rates up to at least 1,000 frames per second.

11. The solid state motion analysis system of claim 1 wherein said telephoto sensor means senses a change in a scene different from the scene captured by said solid state imager means.

12. The solid state motion analysis system if claim 6 wherein said telephoto sensor means senses a change in a scene different from the scene captured by said solid state imager means.

* * * * *